2 Sheets—Sheet 1.
E. DANFORD, Jr.
GRAIN HARVESTER.
No. 7,649. Patented Sept. 17, 1850.
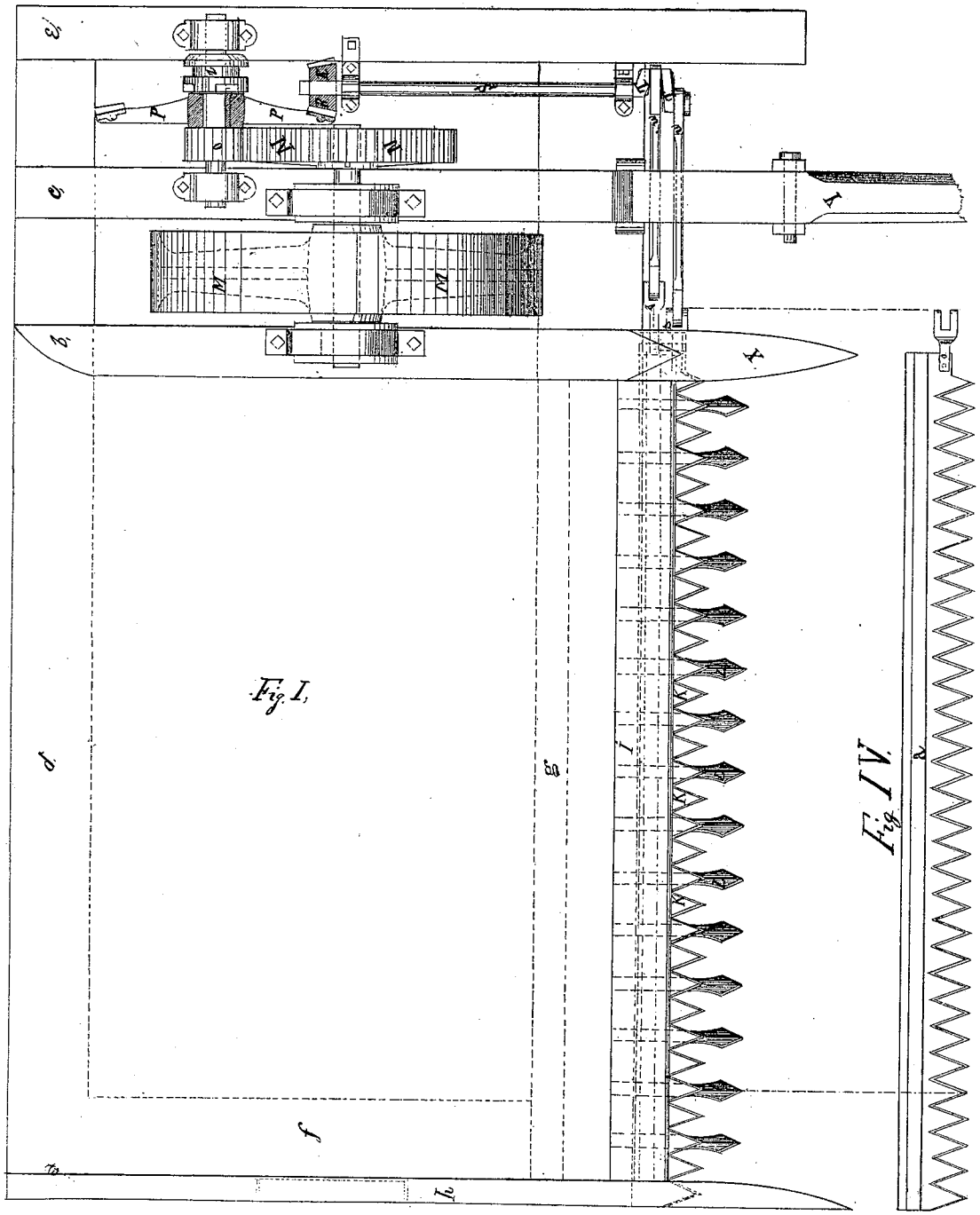

2 Sheets—Sheet 2.
E. DANFORD, Jr.
GRAIN HARVESTER.
No. 7,649. Patented Sept. 17, 1850.
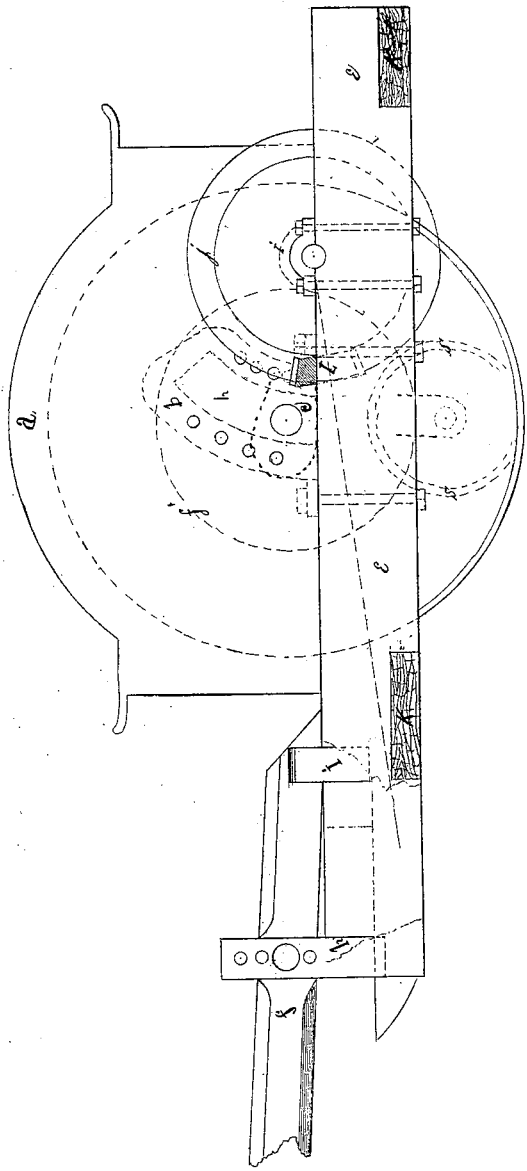
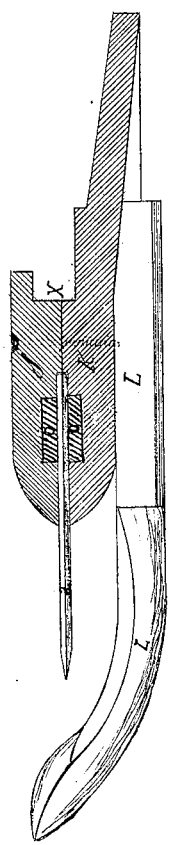

UNITED STATES PATENT OFFICE.

EBENEZER DANFORD, JR., OF GENEVA, ILLINOIS.

IMPROVEMENT IN GRAIN-HARVESTERS.

Specification forming part of Letters Patent No. 7,649, dated September 17, 1850.

*To all whom it may concern:*

Be it known that I, EBENEZER DANFORD, Jr., of Geneva, in the county of Kane and State of Illinois, have invented a new and Improved Mode of Cutting Grain and Grass; and I do hereby declare that the following is a full and exact description thereof, reference being had to the accompanying drawings, and to the letters of reference marked thereon.

The nature of my invention consists in the application of two sickles to a reaping and mowing machine, working together in opposite directions at the same time, so as to throw the weight of the moving parts upon opposite sides of the center of the crank-orbit.

To enable others skilled in the art to make and use my invention, I will proceed to describe its construction and operation.

I construct my reaper in any of the known forms, of which Figure 1 in the accompanying drawings is a suitable and convenient one. To this I attach two sickles by means of sickle-case.

Fig. 3 in the accompanying drawings is an end view of sickle-case, sickles, and sickle-rods in a proper form for use, and as applied to timber $g$ in Fig. 1.

Letter $i$ in Fig. 1 represents a top view of cap to sickle-case, beveled upon its front edge, so as to admit of the grain passing easily onto the platform, and grooved upon its under surface to receive sickle-rod, letter $o$, in Fig. 3.

Letter $k$ in Fig. 3 represents the lower half or bed-piece of sickle-case, grooved upon its upper surface to receive sickle-rod, letter $o$, and corresponding in width to cap $j$ in Fig. 3; from the front edge to groove $x$, thence extending four or six inches under timber $g$ in Fig. 1, and riveted or bolted to the same. The sickle-case may be made of cast or wrought iron or any suitable material.

Fig. 4 in the accompanying drawings is a top view of a detached sickle. The sickles are made of cast-steel plate, the width of which is from four to five inches, the teeth being cut in the front edge, which are two and a half inches in length, and may be varied to suit circumstances. The length of sickle is five feet, or corresponding to the length of platform. The sickles are placed one upon the other, and work face to face. The upper teeth are beveled upon the upper side and the lower ones upon the under side, so as to form a shear cutting-edge.

Letter $a$ in Fig. 4 represents an iron rod riveted to sickle-plate, designed to guide the sickle and afford a coupling-fork upon its end, as shown in Fig. 1, letter $v$.

The advantages of this peculiar arrangement over single crank and sickle reapers are as follows:

First. Cutting upon both sides of the grain or grass with an equal force at the same time. For instance, in cutting metallic substances with shears, where one blade is stationary and the other operating, it will be seen that at least two-thirds of the cutting is performed by the moving blade, whereas if the power is equally exerted upon both blades at the same time, (as in the above arrangement upon both sickles,) the cutting is equally performed by each blade, thereby making a more natural and easy cut.

Second. By obviating all lateral or side shake upon machine or horses, the weight of the moving parts being thrown upon opposite sides of the center of the crank-orbit.

Third. The ability by this arrangement to wield a sufficient weight of sickle (with the same speed) to pass through and cut successfully grass where it yields from two to four tons to the acre, and overcome various impediments—such as cornstalks, large weeds, matted spots of grass, and small bushes—which are found more or less in every harvest-field. The sickles I use for this purpose weigh from ten to twelve pounds each, and when applied to the double crank overcome the above obstacles with perfect ease and success and without producing any lateral shock or vibration, one sickle balancing the other, whereas in the application of the same weight of sickle to a single crank of the same length of lever the lateral shock upon the machine and horses would be such as to render its use almost impracticable. The greatest objections urged against single crank and sickle reapers are the constant wear, tear, and breaking of crank and crank-fastenings, a severe and injurious lateral shock upon machine and knees of horses, which difficulties are almost wholly obviated in the above arrangement.

What I claim as my invention, and desire to secure by Letters Patent, is—

The application to a reaping and mowing machine of two sickles, working together in opposite directions, as set forth in the above specification and accompanying drawings, so as to throw the weight of the moving parts upon opposite sides of the center of the crank-orbit, for the purposes set forth.

EBENR. DANFORD.

Witnesses:
A. DANFORTH,
JOHN CLARKE.